J. B. JOHNS.
HORSE FEEDING MACHINE.
APPLICATION FILED SEPT. 14, 1909.

995,253.

Patented June 13, 1911.

7 SHEETS—SHEET 2.

WITNESSES

INVENTOR
John B. Johns
BY
ATTORNEYS

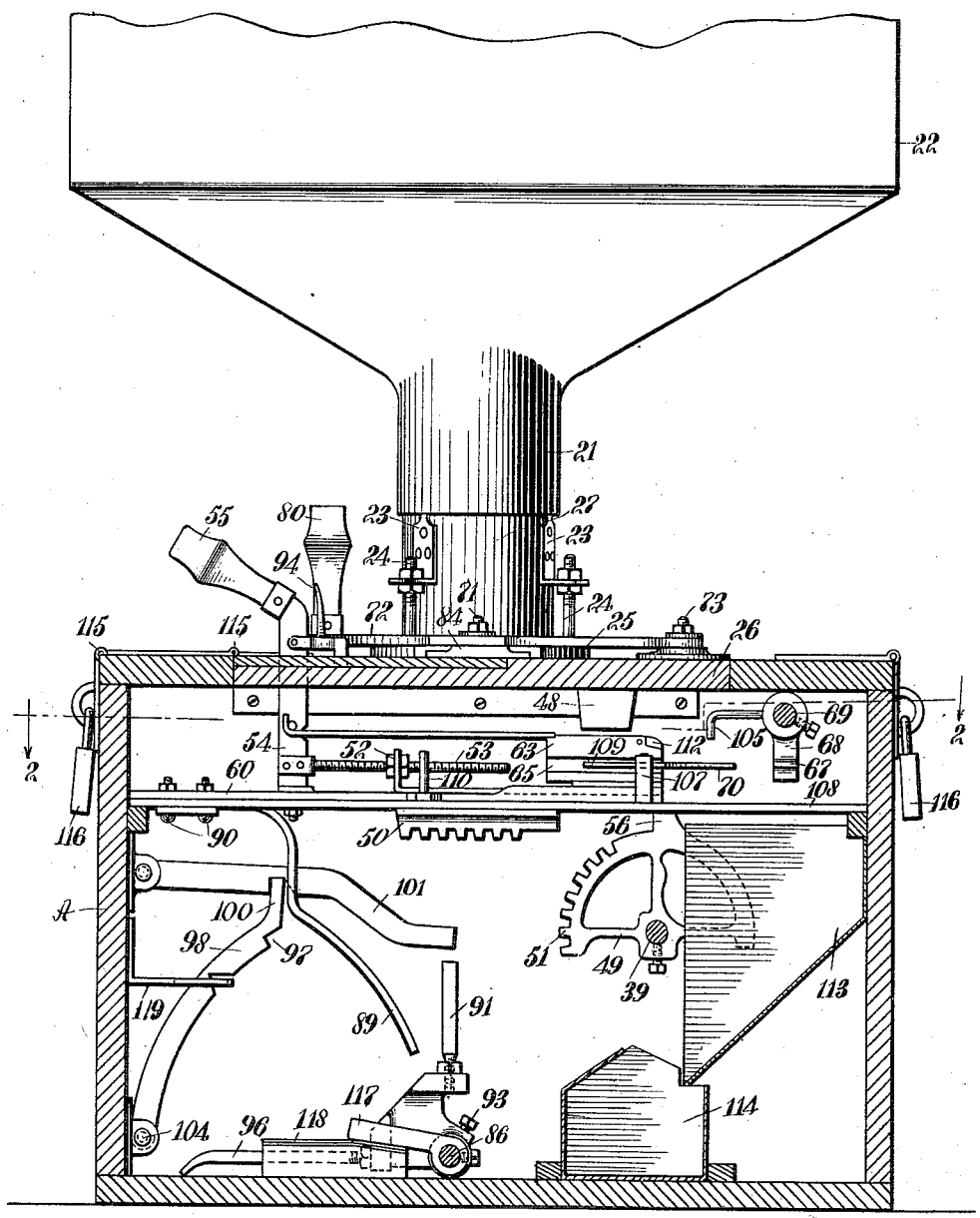

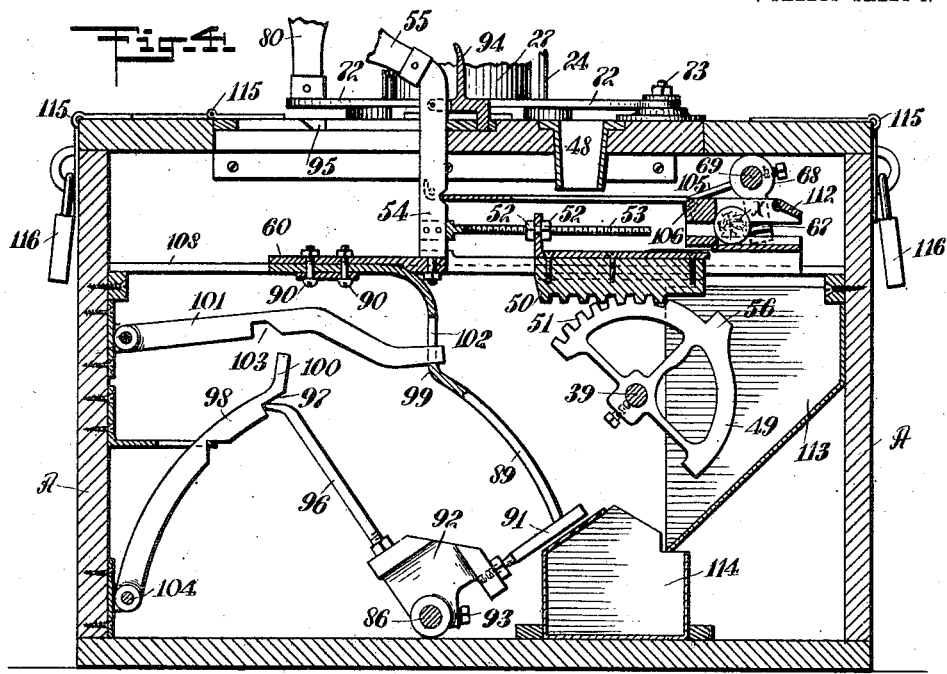

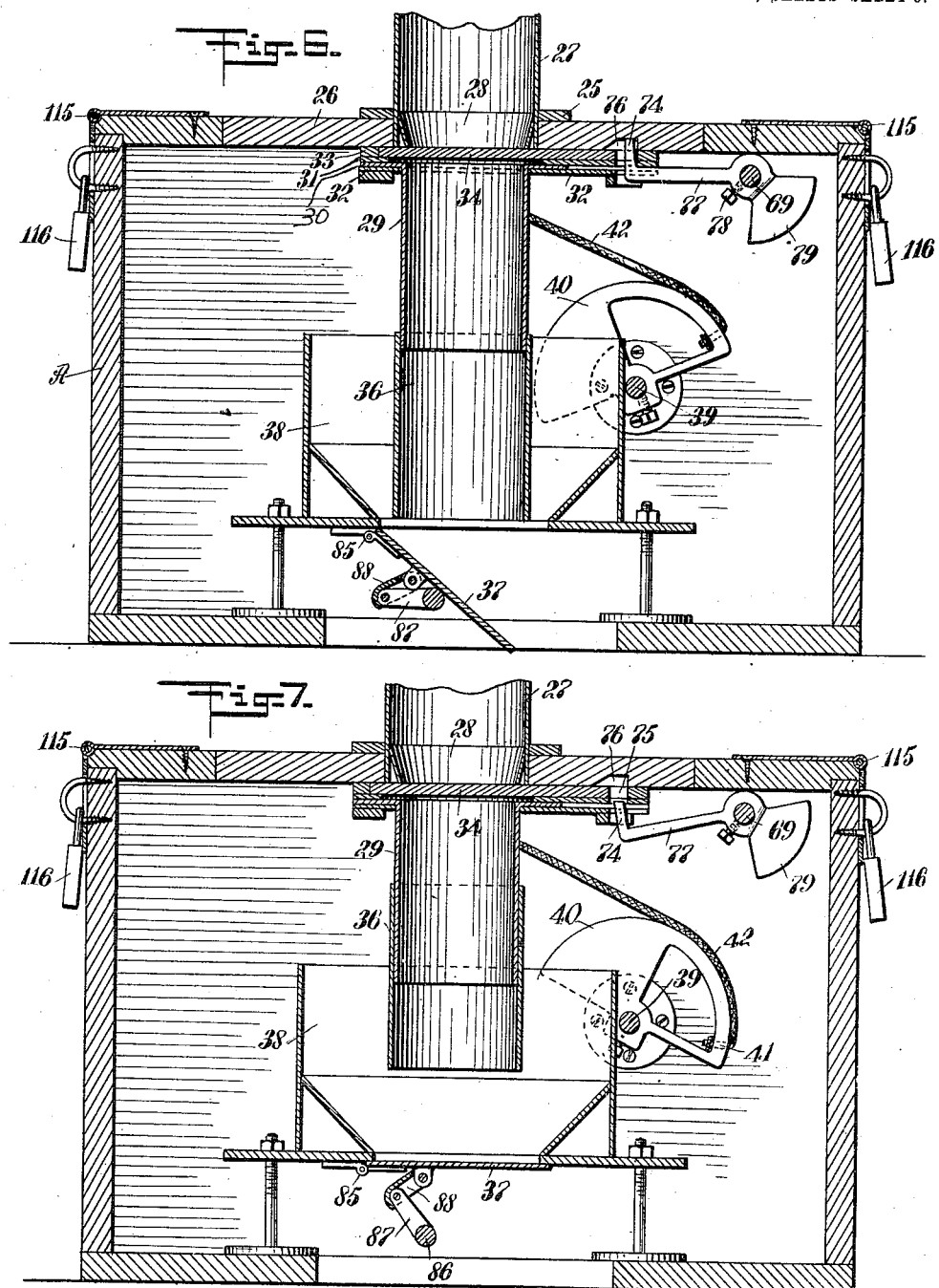

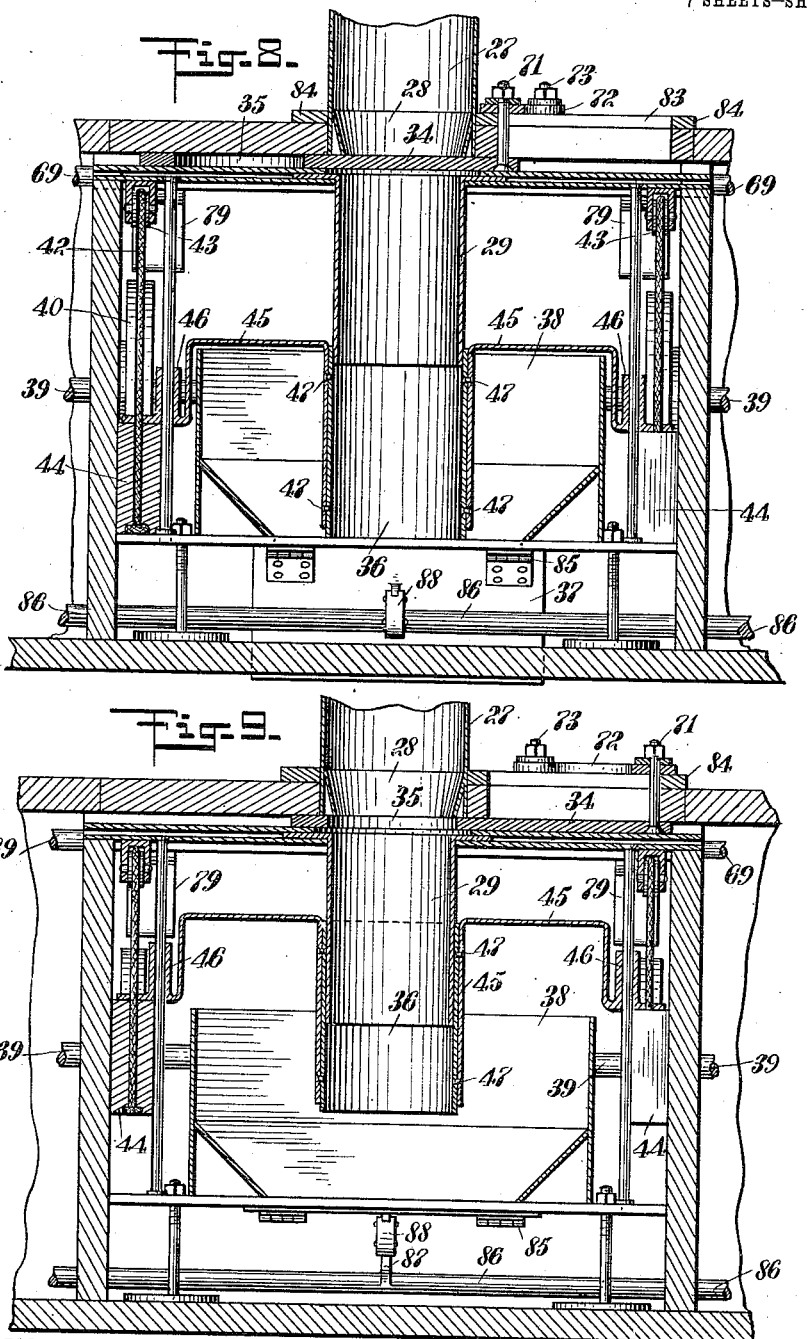

J. B. JOHNS.
HORSE FEEDING MACHINE.
APPLICATION FILED SEPT. 14, 1909.
995,253.
Patented June 13, 1911.
7 SHEETS—SHEET 7.
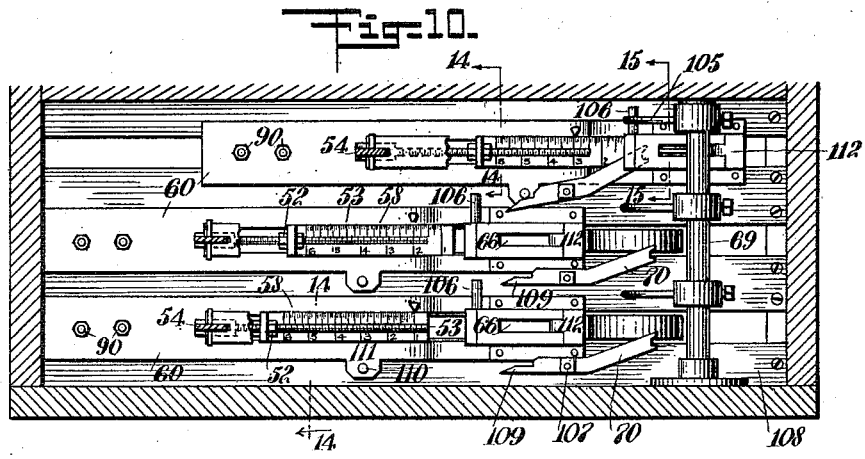
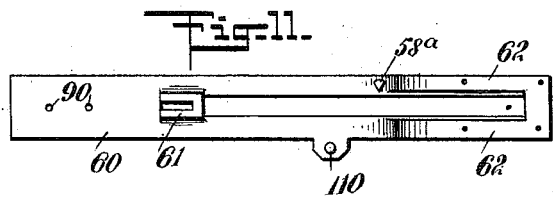
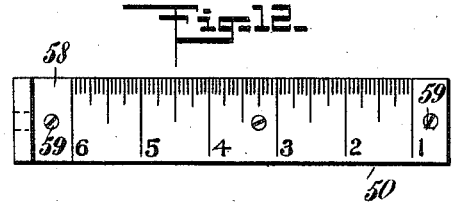
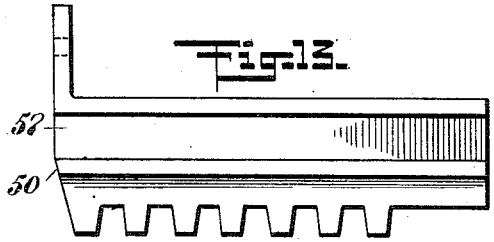
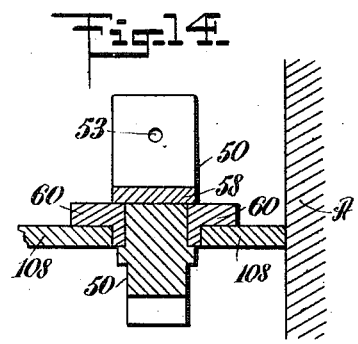
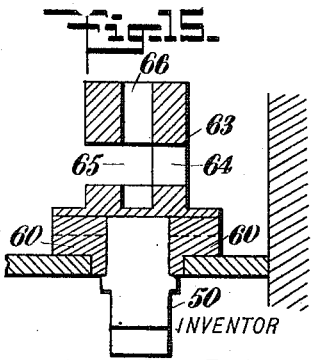
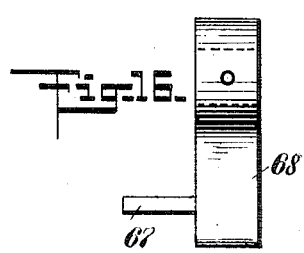
WITNESSES
INVENTOR
John B. Johns
BY
ATTORNEYS

UNITED STATES PATENT OFFICE.

JOHN B. JOHNS, OF FAIRMONT, WEST VIRGINIA.

HORSE-FEEDING MACHINE.

995,253. Specification of Letters Patent. Patented June 13, 1911.

Application filed September 14, 1909. Serial No. 517,603.

*To all whom it may concern:*

Be it known that I, JOHN B. JOHNS, a citizen of the United States, and a resident of Fairmont, in the county of Marion and State of West Virginia, have invented a new and Improved Horse-Feeding Machine, of which the following is a full, clear, and exact description.

Among the principal objects which the present invention has in view are: to provide a machine wherein grain may be measured in bulk quantity to agree with weight; to provide a machine wherefrom various quantities may be delivered, the regulator for said quantities being operated by means of selecting devices; to provide a simple and effective measuring device controlled by a single construction to produce a variety of effects; and to provide a construction for a machine of the character specified which is simple, durable and efficient.

One embodiment of the present invention is disclosed in the structure illustrated in the accompanying drawings, in which like characters of reference denote corresponding parts in all the views, and in which—

Figure 1:
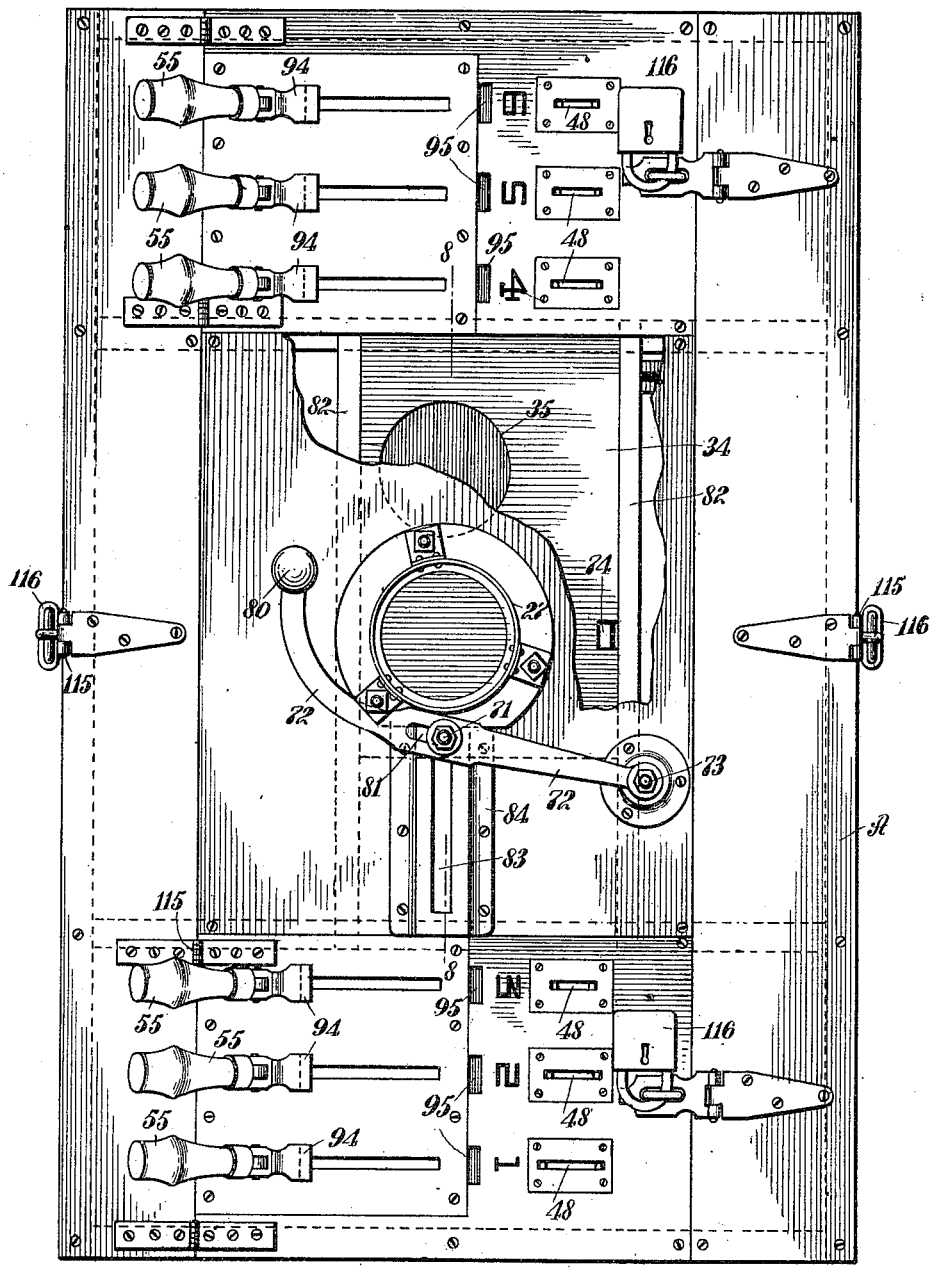
Figure 2:
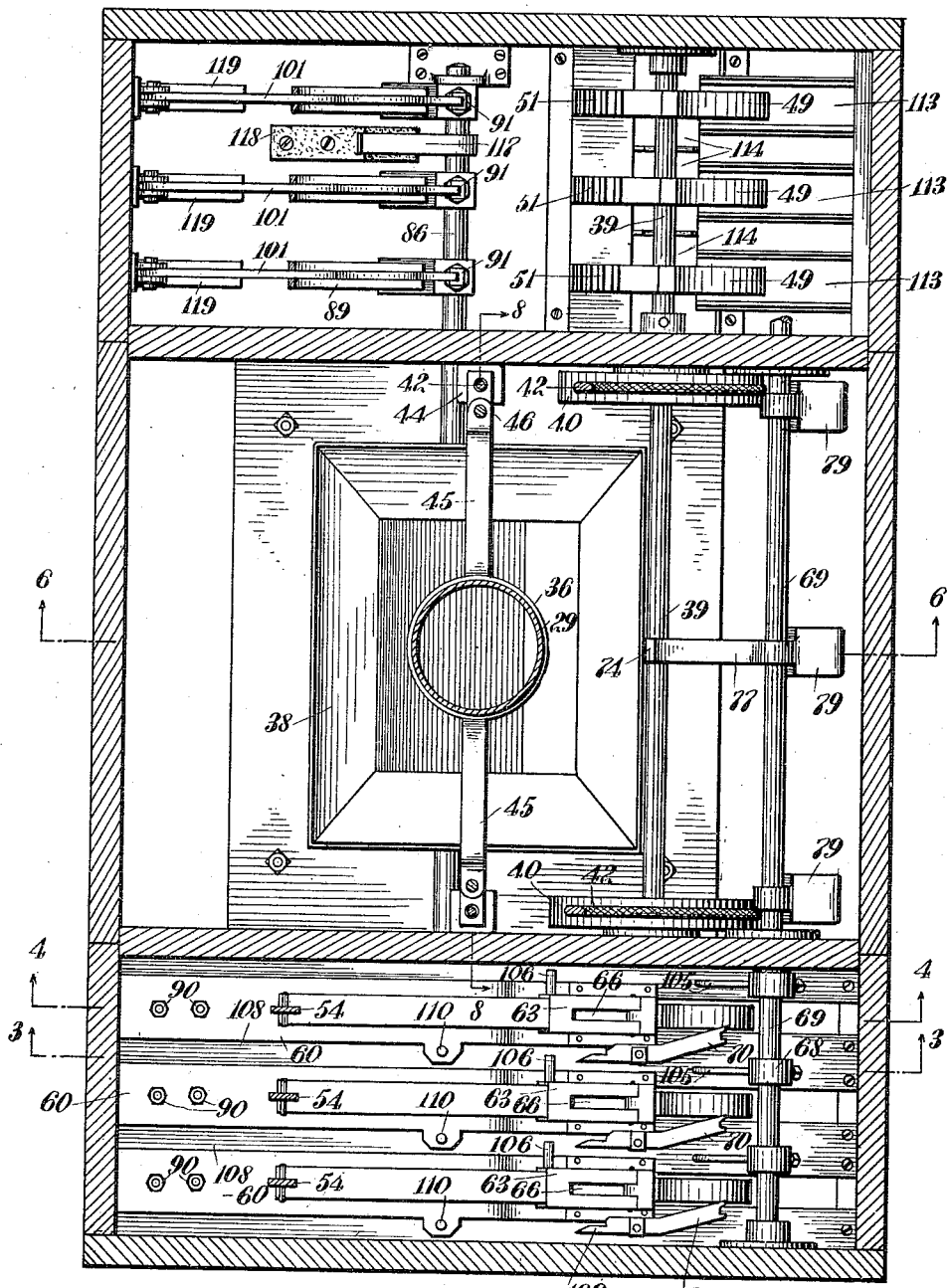

Figure 1 is a top plan view of a measuring apparatus constructed in accordance with the present invention; Fig. 2 is a horizontal sectional view taken on the line 2—2 in Fig. 3; Fig. 3 is a vertical section of the apparatus taken on the line 3—3 in Fig. 2; Fig. 4 is a cross section of the base of the apparatus taken on the line 4—4 in Fig. 2; Fig. 5 is a detail view of the cut-off plate employed in this apparatus; Fig. 6 is a vertical section of the base of the apparatus taken on the line 6—6 in Fig. 2, showing the governing delivery tube in lowered position; Fig. 7 is a view similar to Fig. 6 showing the governing delivery tube in raised position; Fig. 8 is a longitudinal vertical section of the measuring compartment of the apparatus taken on the line 8—8 in Fig. 1, the governing delivery tube being shown in lowered position; Fig. 9 is a view similar to Fig. 8, showing the governing delivery tube in raised position; Fig. 10 is a plan view of a portion of the operating devices for the measuring apparatus; Fig. 11 is a detail view in plan of one of the sliding plates of the operating devices for the measuring apparatus; Fig. 12 is a detail view in plan of one of the graduated plates of the adjustment devices for timing the operation of the operating devices for the measuring apparatus; Fig. 13 is a detail view in side elevation of the rack bar for operating the measuring apparatus; Fig. 14 is a vertical section taken on the line 14—14 in Fig. 10; Fig. 15 is a vertical section of the coin or token receptacle and rack bar for actuating the measuring apparatus; and Fig. 16 is a detail view in side elevation of one of the locking devices for the coin or token mechanism.

In establishments where the usefulness of the present invention will be found of greatest advantage, the grain is purchased in large single quantities, and as a rule, by weight. In the same establishments the grain is distributed by measure. The measuring of the grain may be performed by the superintendent or store keeper, or by the hostlers individually. In such establishments book accounts are kept, and supplies are included in the operation cost and figured somewhat with reference to the estimated cost of feed for a certain head of horse or cattle. It usually arises that this estimate is found to be in error. The error is usually assumed to be due to pilfering or wastage on the part of the hostlers. I have found that the error arises from the fact that grains vary considerably in weight for a given quantity. Assuming on the basis of weight that a quart of oats is the equivalent of a pound, the bookkeeper in such an establishment as portrayed, concludes that he has so many quarts in the ton of oats purchased. The number of quarts required for feeding the stock per diem divided into the total number of quarts gives me the number of days that the ton of oats should last. If, however, as often occurs, the quart of oats weighs one and a quarter pounds, the ton of oats will last only eighty per cent. of the calculated time. With careful feeders of stock it is desired to feed entirely by weight, but to weigh the supply on the usual scales causes considerable delay, and therefore the measuring system is in vogue, it being assumed that a quart measure of grain has a definite weight.

It is to obviate the various objections arising from the above described system that I have provided the present apparatus. In this apparatus the grain is delivered by means of a supply pipe 21 from a hopper 22, or any suitable source of supply, such as an overhead pen. A pipe 27 is provided with strap brackets 23, 23, the upturned ends whereof engage bolts 24, 24 which are upset from a collar 25 which is secured rigidly to the top 26 of a feed box A. The pipe 27 is slidably mounted in the lower end of the pipe 21. The lower extremity of the pipe 27 is provided with an internal funnel mouth piece 28. The lower end of the funnel mouth piece 28 is contracted to a smaller diameter than a pipe section 29 rigidly mounted upon the top 26 and extended within the feed box A. The pipe section 29 is provided with an annular flange 30 by which it is clamped between plates 31 and 32. The plate 31 forms, in conjunction with a plate 33, a slide for a cut-off plate 34, which controls the opening between the pipe 27 and the pipe section 29. The plate 34 is of the shape substantially as shown in Fig. 5 of the drawings, with an opening 35 through which the grain passes when said opening is alined with the pipes 27 and 29. Telescopically mounted upon the pipe 27, and surrounding the same, is a pipe section 36. The pipe section 36 is of sufficient length to be extended to rest upon the trap door 37 of a hopper 38. The trap door 37 is normally open, as shown in Fig. 6 of the drawings. When, however, the opening 35 is moved into line with the pipes 27 and 29, the door 37 is closed, as shown in Fig. 7 of the drawings. When the door 37 is thus closed the hopper 38 is in condition to receive the grain delivered from the pipe 29.

The quantity of grain delivered into the hopper 38 is regulated by the lift of the section 36. Grain, as do all dry comminuted material, flows to a certain upper inclined surface formation. When delivered from a central point this formation will be conical, the sides of the cone varying with the character and size of the material being handled. Thus, with regard to the height of the column contained in the pipes 27 and 29 and the section 36, the grain will not flow from under the edge of the section 36 to a height greater than the flattened cone shape referred to. Therefore, the measuring in the present invention is regulated by raising and lowering the section 36 within the hopper 38. The grain contained in the pipe 29 and section 36, when the said section is lowered to the door 37, is the minimum unit of weight handled by this machine. As the section is raised the material spreads from under the bottom of the said section and increases the volume carried above the door 37 in proportion as the said section is thus raised. To raise the section 36 I have provided a shaft 39 upon which are fixedly mounted quadrants 40, 40. The quadrants 40 are two in number and extend to either side of the hopper 38. Anchored at 41, upon the said quadrants 40, are lifting chains or cables 42, 42. The chains or cables 42 are extended over pulleys 43, 43 and threaded through weights 44, 44. The arms 45, 45 form guide sockets 46, 46, and are rigidly attached at 47, 47 to the section 36. The outer ends of the arms 45 are secured upon the weights 44, the sockets 46, 46 of the said arms forming guide members for both the said arms and the said weights. When the weights 44 are raised by the cables 42, the said arms 45, and the section 36 fixedly connected therewith, are likewise raised.

The shaft 39 is rotated to lift the section 36 to a series of pipes, by means of a series of distinct operating mechanisms which are operated by the interposition of coins or tokens X. There is illustrated in Fig. 1 of the drawings a selective mechanism whereby the section 36 may be raised to six ascertained and various heights and fractions thereof to correspond to the six delivery handles. When the proper coin or key X is introduced in the slots 48, 48, segments 49, 49 which are fixedly mounted upon the shaft 39 at either end of the feed box A, may be rotated. As above explained, the rotation of the shaft 39 rotates the quadrants 40, 40 to raise the section 36. The extent to which the segments 49, 49 are rotated is regulated by rack bars 50, 50. The position of the rack bars 50, 50 with reference to the segments 49, 49 and the gear teeth 51, 51 thereof, is adjusted by set nuts 52, 52 which threadably engage elongated screws 53, 53. The elongated screws 53, 53 are rigidly mounted upon arms 54, 54 at the upper ends whereof are mounted handles 55, 55. With a mechanism constructed as thus described the handles 55, 55 are drawn toward the slots 48, 48, causing the rack bars 50, 50 to engage the heads 56, 56 of the segments 49, 49 to move the teeth 51, 51 into position to engage the teeth of the rack bars 50, 50 and to thereby rotate the shaft 39. By adjusting the nuts 52, 52 to advance or retract the rack bars 50, 50 upon the screws 53, 53, it will be seen that the extent of movement imparted to the segments 49, 49 and the shaft 39 may be regulated. Thus, beginning at the slot 48 marked by the numeral 1, the rack bar 50 is adjusted so that at the extreme throw of the handle 55 the rack bar 50 strikes upon the head 56 and does not move the same. The rack bar 50 connected with the handle 55 operating in line with the slot designated by the numeral 2 is then adjusted to rock the segment 49 to cause the section 36 to lift to deliver into the hopper 38 an added quantity of grain, doubling the quantity delivered by the first operation. Again the rack bar 50 attached to the handle 55 in line with the slot 48 designated by the numeral 3 is advanced to rotate the segment 49 to rock the shaft 39 to raise the section 36, so that there is delivered into the hopper 38 sufficient grain to increase the quantity to three times the original delivery, or that delivered by operating the handle 55 opposite the numeral 1. The increasing adjustment of the rack bar 50 is carried forward for those rack bars attached to the handles 55 set opposite the slots 48 bearing the numerals 4, 5 and 6.

When a new lot of grain is purchased a measured test quantity is run into the hopper 38 and verified for weight. If the grain be found to be heavier or lighter than the standard, the nuts 52, 52 are adjusted so that the rack bars 50, 50 are advanced or retracted, as the case may be, to rock the shaft 39 to a greater or lesser extent. In this manner it will be seen that the quantity of grain delivered by the machine is regulated according to the weight of the grain, while the operation of measuring is performed as in handling liquid materials.

The rack bars 50, 50 are provided with side slots 57, 57, the upper extensions of which are formed by graduated plates 58, 58. The plates 58 are secured by means of screws 59, 59 to the rack bars 50. The sliding blocks 60 are provided with slotted pads 61, in which are rigidly secured the arms 54, 54. The blocks 60 have in the forward ends raised sides 62, 62, on which are secured coin or key holding blocks 63, 63. These blocks 63 are provided with slots 64, 65 and 66. The slot 64 is provided to admit from the forward end of the block 63 an arm 67 set out from the side of a crank arm 68, which is mounted upon a shaft 69. The slot 65 is provided to admit from the rear end of the block 63 the ends of levers 70, 70 when the block 63 is retracted. The slot 66 is provided to aline with the slots 48, 48 in the plates mounted upon the top of the feed box A to receive the various coins or keys X. By means of the graduated plates 58, all of the racks 50 may be advanced to the same degree, each of the blocks 60 being provided with an index 58ᵃ to aid in this adjustment. Further, by means of the graduated scale, the handles 55, 55 may be advanced to carry the blocks 60 forward to measure fractional parts of the unit for which the blocks 60 are designed.

The operation of the handles 55, 55 and the consequent rocking of the shaft 39 raises and lowers the section 36. Until the grain is permitted to flow into the pipe 29 this operation is futile. The grain is not permitted to flow into the pipe 29 until the plate 34 is drawn to the position wherein the opening 35 is presented under the pipe 27. The plate 34 is pivotally connected at 71 to a lever 72 which is pivoted at 73 on the top 26 of the feed box A. The plate 34 is locked in the position illustrated in Fig. 1, where the opening 35 is out of alinement with the pipe 27, by means of a latch head 74 which extends into a recess 75 formed in the side of the plate 34. The latch head 74 is seated in a recess 76 formed in the under side of the top 26 of the feed box A. The latch head 74 is carried on the end of a latch arm 77, which is rigidly secured by a set screw 78 upon the shaft 69. The latch arm 77 is provided with a heavy counter-weight 79 whereby the arm 77 is maintained in a horizontal position to raise the head 74 into engagement with the recesses 75 and 76. While the head 74 remains in the recess 75, the plate 34 may not be moved by the lever 72. It is only when the coin or key X, as shown in Fig. 4 of the drawings, is carried by the block 63, that the shaft 69 is rocked so that the head 74 is depressed out of engagement with the recesses 75 and 76. The operator may then grasp a handle 80 and throw the lever 72 about its pivot 73 until the opening 35 is brought beneath the pipe 27. In this action the pivot is permitted to slide in a slot 81 formed in the lever 72. The plate 34 is guided in its action by the guide rails 82, 82 and a slot 83 formed in a guide plate 84, rigidly mounted upon the top 26 of the feed box A. When the opening 35 is alined with the pipes 27 and 29, as just above described, the trap door 37 is raised to the closed position illustrated in Fig. 7 of the drawings, and the grain delivered by thus opening the pipe 27 is held in the hopper 38. The quantity of grain delivered is regulated by the selection of the handle 55 and instrumentalities connected therewith which have been operated with the coin or key X contained in the block 63, which coin or key X has rocked the shaft 69 to permit the movement of the plate 34. The door 37 is hingedly mounted at 85 on the under side of the hopper 38, and is operated from a shaft 86 to which it is connected by means of a crank arm 87 and a connecting link 88 pivotally connecting the arm 87 and the door 37. The shaft 86 is rocked by depended arms 89, 89, which are rigidly secured at 90, 90 to the sliding blocks 60. The arms 89 are advanced to impinge upon upright arms 91, 91 upset from a block 92 rigidly attached by means of set screws 93 on the shaft 86. Each of the blocks 60 is provided with one of the arms 89, consequently, with the operation of each of the handles 55 the door 37 is closed. Each of the arms 54 is provided with a pivoted latch 94, 94, which drops into a slot 95 formed in the top 26 of the feed box A, and located at the extreme forward and rearward positions of the arms 54. When the latch 94 drops into the advanced slot 95, the arm 54, and parts connected therewith, are held in their advanced position. This holds the door 37 closed. The door 37 is maintained in the closed position after the handle 55 is released and the block 60 is retracted to near its normal position. The shaft 86 is prevented from rocking to the open position for the door 37 by arms 96, 96, the ends of which are crooked to strike within recesses 97, 97 of rack arms 98, 98. When, however, the blocks 60, and with them the arms 89, are retracted to their normal position, the vertical extensions 99, 99 thereof strike upon heads 100, 100 of the rack arms 98, 98, raising the same until the arms 96 are freed, allowing the shaft 86 to rock and open the door 37. The action of the arms 89 is guided by guide arms 101, 101 which are extended through slots 102, 102 in the arms 89. The guide arms 101 are provided with recesses 103, 103 to receive the heads 100 of the rack arms 98. The rack arms 98 are pivoted upon a shaft 104 extended lengthwise of the feed box A. When the block 63 is holding the coin or key X, and is advanced to this forward position, the coin or key X strikes upon the arm 67, as above described, and rocks the shaft 69 so that the plate 34 may be moved. At the same time it depresses a hook 105 to fall over a pin 106 set out from the block 63. This engagement between the hook 105 and the pin 106 prevents the retraction of the block 63 and parts connected therewith, while the arm 67 is engaged by the coin or key X, and while the shaft 69 is rocked to depress the lever 77. The shaft 69 cannot be rotated to free the hook 105 from the pin 106 until the recess 75 in the plate 34 is returned to its normal position, so that the head 74 may be raised upward through the said recess and into the recess 76. It therefore becomes necessary to close the plate 34 over the pipe 27 before the door 37 may be opened by the retraction of the block 60 and the arm 89 connected therewith.

The coin or key X is extracted from the slot 66 by means of the levers 70, 70. These levers are pivoted at 107, 107 upon structural plates 108, 108 of the machine, and are provided with beveled tail pieces 109, 109, so adjusted as to be wiped by pins 110, 110 mounted in extensions 111, 111 formed on the blocks 60. With the advance of each of the blocks 60, the pins 110 wipe the beveled ends of the levers 70 to throw the same outward to extend the forward ends of the said levers inward and into the path of the coin or key X, when held in the said slot 66. At the forward end of the block 63, extended across the slot 66, is a pivoted apron 112. This serves to maintain the coin or key X in the block 63 during the operation of the machine. When, however, on the return of the block 63, the lever 70 striking behind the coin or key X, the apron 112 yields to the pressure from behind, permitting the coin or key X to pass out of the slot 66 and the block 63. When in the course of operation a second coin or key is placed in the slot 66 and advanced to the forward position, the coin or key X strikes upon the back of the forward end of the lever 70, moving it to one side to pass the coin or key X, and to reset the tail piece 109 into the path of the pin 110. It will be understood that in the operation of the blocks 60, that the coin or key X is extracted from the pocket holding the same prior to the opening of the door 37. In this manner is prevented the double use of the said coin or key. When the coin or key X is thus extracted from the block 63, it is precipitated prevented the double use of the said coin or key X to boxes 114, 114 which are provided each for a certain class or character of the said coins or keys X.

The various parts of the said machine are hinged at 115, 115, which hinged parts are suitably locked by pad locks 116, 116. By means of this arrangement the working parts may be readily accessible to the party carrying the key, while being secured against tampering by outside interference.

The extent of rotation of the shaft 86 is governed by an extension 117 and a block 118. The extension 117 may be given sufficient weight to cause the action of the shaft 86 and door 37 to operate more quickly. The rack arms 98 are guided in their movement by guide plates 119, 119 set out from the side of the feed box A.

Having an apparatus of the character described, and as shown in the drawings, the operation is as follows:—It will be understood that the various handles 55, and operating mechanism connected therewith, are connected by means of coins or keys of different sizes or shapes, which are designed to be inserted in the various slots 48 prior to moving the various handles 55. As a part of the system in which this apparatus is employed the various hostlers or drivers are supplied with one or more coins or keys applicable to the known needs of his team. For instance, it is designed that a horse being driven by a certain driver should receive two pounds or two quarts of grain, therefore that driver would be supplied with a coin or key which would fit within the slot 48 bearing the designating numeral 2. When now the driver desires to obtain the grain, he first places the coin or key within the slot 48 adapted to receive the same. The coin or key drops into the slot 66 of the block 63 where it is held. The handle 55 opposite the said slot is then advanced until the latch 94 rests within the slot 95. The coin or key X impinges upon the arm 67 and rocks the shaft 69 so that the hook 105 is depressed over the pin 106, and the latch arm 77 is depressed to withdraw the head 74 from the recesses 75 and 76. This rocking of the shaft 69 locks the block 63 and parts connected therewith in operative position, while releasing the plate 34. With the handle 55 in this position the driver next grasps the handle 80 of the lever 72 and draws the same to one side until the opening 35 in the plate 34 is advanced under the pipe 27.

In advancing the handle 55, as above described, there has also been advanced the arm 89 connected therewith, which has impinged upon the arm 91, causing the shaft 86 to rock, and through the connecting lever 87 and the link 88 to close the door 37. It is while the door 37 is in its closed position that the plate 34 is moved to present the opening 35 to the pipe 27, and the grain delivered from the hopper 22 is permitted to flow into the hopper 38 until the grain in the hopper reaches the height therein at which the grain ceases to flow under the edge of the section 36. Simultaneously with the closing of the door 37 and the advancing of the block 63 bearing the coin or key X, there has been advanced the rack bar 50 connected with the handle 55 opposite the slot in which the coin or key X was deposited. As above stated, the bar 50 has been adjusted so that in the forward movement of the handle 55 the said bar engages the segment 49 set in its path to rotate the shaft 39. The extent of the rotation of the shaft 39 raises the section 36 on the pipe 29 proportionately. In the present illustration, by operating the handle 55 set opposite the slot designated by the numeral 2, the engagement between the rack bar 50 and the segment 49 will cause the shaft 39 to rotate sufficiently to raise the section 36 to permit sufficient grain to flow under the edge of the said section, to add to the quantity contained within the pipe 29 and section 36 below the plate 34 when the same is closed, to equal the two pounds or quarts, as the case may be, designed to be delivered by the operation of the said handle 55. It will be noticed now that the door 37 is closed, and cannot be opened until the handle 55, which has been advanced, is retracted. It will be seen that the handle 55 may not be retracted until the hook 105 is raised from engagement with the pin 106. It will also be seen that the hook 105 cannot release the pin 106 until the plate 34 is moved into position where the recess 75 registers with the head 74 of the latch 77. To register the recess 75 with the head 74 requires that the plate 34 shall be moved into a position wherein the pipe 29 is closed. The operator here moves the handle 80 to its normal position. He then draws backward to its normal position the handle 55. Into the receptacle which he has placed below the door 37 is emptied the contents of the hopper 38 by the opening of the door 37. The door 37 is thus opened by the extension 99 of the arm 89 striking upon the head 100 of the rack arm 98, releasing thereby the arm 96 from engagement with the said rack arm, and permitting thereby the weight of the door 37 and the arm 96 to throw the door 37 to its opened or delivering position. It will be found that the quantity of grain thus delivered equals two units of the weight of the purchased grain.

Where a system is employed embodying the operation of an apparatus such as described, it will be found that the tally of the distribution counts for the total bulk purchase of grain. As an aid to this tally will be the various coins or keys X.

As the handles 55 are retracted to their normal position, the coins or keys X are extracted from the block 63 and delivered into the various chutes 113, to be guided to the individual boxes or receptacles 114. Each of these receptacles represents, at the end of a day, week or other period, the number of operations of the handles 55 set opposite the slot to which each of the various boxes 114 are connected. Hence, by counting the number of coins or keys X in any one box, and multiplying the number by the numeral designating the slot feeding the said box, there is arrived at the resultant number of units of grain delivered through the manipulation of the particular handle set opposite the particular slot connected with the box in question. Hence, if there should be found to be one hundred coins or keys X in the box feeding through the slot numbered 6, this would show that six hundred pounds, or quarts, as the unit might be, had been delivered through the machine by the operation of the handle 55 set opposite the numeral 6. By totaling the results registered in each box will give the grand total of the number of units delivered through the machine in a given time.

Having thus described my invention, what I claim as new and desire to secure by Letters Patent is:—

1. A horse feeding machine, comprising a magazine for holding grain and having a depended tubular delivery pipe; a telescopic tube disposed in line with said pipe and having an end section adjustable vertically; a hopper surrounding said tube; a rotary shaft; means for operatively connecting said shaft and said tube to raise and lower said tube; a valve plate to close the delivery pipe of said magazine, said plate having an opening therein adapted to be alined with said delivery pipe and said tube; a door pivotally mounted upon the bottom of said hopper; a rocking shaft having an extension adapted to rest in the path of said plate when the said door is in opened position; a second rotary shaft; means for operatively connecting said second rotary shaft and said door to close and open the same; a transmission mechanism operatively connecting said rotary shaft and said rocking shaft to operate the same in unison to remove the said extension from the path of the said valve plate when the said door is closed; and manually operated means for moving the said valve plate to aline the opening therein with said pipe and said tube when said extension of the rocking shaft is removed from the path of said valve plate.

2. A horse feeding machine, comprising a magazine for holding grain and having a delivery pipe depended therefrom; a feed box infolding the delivery end of said delivery pipe; a hopper disposed below said delivery pipe and within said feed box; a valve plate slidably mounted within said feed box to close the end of said delivery pipe and provided with a perforation adapted to be alined with said delivery pipe to permit the flow of grain therethrough; a door for closing said hopper; a telescopic tube mounted in said feed box in line with said delivery pipe and extended within said hopper; manually operated means for moving said valve plate to aline the perforation therein with said delivery pipe and said tube; a locking member pivotally mounted in said feed box and arranged to engage the said valve plate in locking relation when the perforation in said plate is moved out of alinement with said delivery pipe; manually operated means for adjusting the movable section of said tube vertically in said hopper; a transmission mechanism operatively connecting said tube adjusting means and said door to close said door coincidently with the adjustment of said tube; and means for removing the said locking member from locking relation with said plate when said tube is adjusted, said means being placed in position to be released by the mechanism operating to adjust said tube.

3. A horse feeding machine, comprising a magazine for holding grain and having a depended delivery pipe; a feed box infolding the delivery end of said pipe; a hopper disposed below and in line with said pipe; a valve plate to close said pipe and having a delivery opening therein adapted to aline with said pipe, said plate slidably mounted in said feed box; a delivery door hingedly mounted upon the bottom of said hopper; a telescopic tube mounted on said feed box and in line with said delivery pipe to receive grain therefrom, said tube having a movable section depended within said hopper and vertically adjustable therein; a mechanism to raise and lower the said movable section of said tube, said mechanism embodying a rocking shaft journaled in said feed box and a flexible connection between the said shaft and said movable section; a plurality of reciprocating members; means for operatively connecting said members and said shaft to rotate the same; means for varying the extent of rotation of said shaft by each of said reciprocating members; a transmission mechanism operatively connected with said reciprocating members and with said door to close the said door coincidently with the operation of said reciprocating members; a locking mechanism for said valve plate; and means for operatively connecting said locking mechanism and said reciprocating members to release said plate when said reciprocating members are moved to rotate said rocking shaft.

4. A horse feeding machine, comprising a magazine for holding grain and having a depended delivery pipe; a feed box connected with said magazine to infold the delivery end of said pipe; a hopper mounted in said feed box and below and in line with said delivery pipe; a valve plate slidably mounted in said feed box to close the end of said delivery pipe, said plate having a perforation adapted to be alined with said delivery pipe to form a passage for the grain when being delivered therefrom; a handle for shifting said plate; a door for closing said hopper and pivotally mounted upon the bottom thereof; a telescopic tube mounted in said feed box and in line with said delivery pipe and having a movable lower section; a rocking shaft journaled in said feed box and provided with a series of members; a flexible connection between said movable section of the telescopic tube and one of said members and for raising and lowering said movable section; a series of reciprocating devices manually operable for engaging respectively the other of said members to rotate the said rocking shaft; a transmission mechanism operatively connecting said door of said hopper and said reciprocating devices to close the said door when said reciprocating devices are operated; and a locking device for holding the said valve plate in closed relation with said delivery pipe, said locking device arranged to be released by the operation of said reciprocating devices.

5. A horse feeding machine, comprising a magazine for holding grain and having a depending delivery pipe; a feed box connected with said magazine to infold the delivery end of said pipe; a hopper mounted on said feed box and below and in line with said delivery pipe; a valve plate slidably mounted in said feed box to close the end of said delivery pipe, said plate having a perforation adapted to aline with said delivery pipe to form a passage for the grain when being delivered therefrom; a handle for shifting said plate; a door for closing said hopper and pivotally mounted upon the bottom thereof; a telescopic tube mounted in said feed box and in line with said delivery pipe and having a movable lower section; a rocking shaft journaled in said feed box and provided with a series of members; a flexible connection between said movable lower section of said tube and one of said members for lifting said lower section; a series of manually operable reciprocating devices for engagement with the other of said members to rotate said rocking shaft; a transmission mechanism operatively connecting said door of said hopper and said reciprocating devices to close the said door when said reciprocating devices are operated; a locking device for holding the said valve plate in closed relation with said delivery pipe, said locking device being arranged to be released by said reciprocating devices; and a plurality of registry devices for indicating the number of times the said lower section of said tube is adjusted by each of said reciprocating devices.

6. A horse feeding machine, comprising a magazine for holding grain and having a depended delivery pipe; a feed box connected with said magazine to infold the delivery end of said pipe; a hopper mounted in said feed box and below and in line with said delivery pipe; a valve plate slidably mounted in said feed box to close the end of said delivery pipe, said plate having a perforation adapted to be alined with said delivery pipe to form a passage for the grain when being delivered therefrom; a handle for shifting said plate; a door for closing said hopper and pivotally mounted upon the bottom thereof; a telescopic tube mounted in said feed box and in line with said delivery pipe and having a movable lower section; a rocking shaft journaled in said feed box and provided with a series of members; a flexible connection between said movable section of said tube and one of said members and for raising and lowering said movable section; a series of reciprocating devices manually operable for engaging respectively the others of said members to rotate the said rocking shaft; a plurality of devices one mounted upon each of said reciprocating devices and adjustable thereon to vary the extent of the rotation produced by each of the said reciprocating devices upon the said rocking shaft; a transmission mechanism operatively connecting said door of said hopper and said reciprocating devices to close the said door when said reciprocating devices are operated; and a locking device for holding the said valve plate in closed relation with said delivery pipe, said locking device arranged to be released by the operation of said reciprocating devices.

7. A horse feeding machine, comprising a magazine for holding grain and having a depended delivery pipe; a feed box connected with said magazine to infold the delivery end of said pipe; a hopper mounted on said feed box and below and in line with said delivery pipe; a valve plate slidably mounted in said feed box to close the end of said delivery pipe, said plate having a perforation adapted to be alined with said delivery pipe to form a passage for the grain when being delivered therefrom; a handle for shifting said plate; a door for closing said hopper and pivotally mounted upon the bottom thereof; a telescopic tube mounted in said feed box and in line with said delivery pipe and having a movable lower section; a rocking shaft journaled in said feed box and provided with a series of members; a flexible connection between said movable section of said tube and one of said members and for raising and lowering said movable section; a series of reciprocating devices manually operable for engaging respectively the others of said members to rotate the said rocking shaft; a plurality of engaging devices mounted on said reciprocating devices for engaging said rocking shaft; fixed means for limiting the reciprocation of said reciprocating devices; means for varying the disposition of said engaging devices on said reciprocating devices; a transmission mechanism operatively connecting said door of said hopper and said reciprocating devices to close the said door when said reciprocating devices are operated; and a locking device for holding the said valve plate in closed relation with said delivery pipe, said locking device arranged to be released by the operation of said reciprocating devices.

8. A horse feeding machine, comprising a magazine for holding grain and having a depended delivery pipe; a feed box connected with said magazine to infold the delivery end of said pipe; a hopper mounted on said feed box and below and in line with said delivery pipe; a valve plate slidably mounted in said feed box to close the end of said delivery pipe, said plate having a perforation adapted to be alined with said delivery pipe to form a passage for the grain when being delivered therefrom; a handle for shifting said plate; a door for closing said hopper and pivotally mounted upon the bottom thereof; a telescopic tube mounted in said feed box and in line with said delivery pipe and having a movable lower section; a rocking shaft journaled in said feed box; a flexible connection between said movable section of said tube and said shaft and for raising and lowering said movable section; a series of gear wheels mounted on said shaft; a series of reciprocating arms slidably mounted in said feed box in line with said gear wheels; a series of rack bars slidably mounted on said reciprocating arms the teeth whereof are adapted to mesh with the teeth of said gear wheels; means for locking said rack bars in adjusted position on said reciprocating arms; a transmission mechanism operatively connecting said door of said hopper and the reciprocating arms to close the said door when said reciprocating arms are operated; and a locking device for holding the said valve plate in closed relation with said delivery pipe, said locking device arranged to be released by the operation of said reciprocating arms.

9. A horse feeding machine, comprising a magazine for holding grain and having a depended delivery pipe; a feed box connected with said magazine to infold the delivery end of said pipe; a hopper mounted in said feed box and below and in line with said delivery pipe; a valve plate slidably mounted in said feed box to close the end of said delivery pipe, said plate having a perforation adapted to be alined with said delivery pipe to form a passage for the grain when being delivered therefrom; a handle for shifting said plate; a door for closing said hopper, and pivotally mounted upon the bottom thereof; a telescopic tube mounted in said feed box and in line with said delivery pipe, and having a movable lower section; a rocking shaft journaled in said feed box and provided with a series of members; a flexible connection between said movable section of said tube and one of said members and for raising and lowering said movable section; a series of reciprocating devices manually operable for engaging respectively the others of said members to rotate the said rocking shaft; a transmission mechanism operatively connecting said door of said hopper and said reciprocating devices to close the said door when said reciprocating devices are operated; a locking device for holding the said valve plate in closed relation with said delivery pipe, said locking device arranged to be released by the operation of said reciprocating devices; and a locking mechanism to engage each of said reciprocating devices when advanced to rotate the said rocking shaft to prevent the return thereof.

10. A horse feeding machine, comprising a magazine for holding grain and having a depended delivery pipe; a feed box connected with said magazine to infold the delivery end of said pipe; a hopper mounted in said feed box and below and in line with said delivery pipe; a valve plate slidably mounted in said feed box to close the end of said delivery pipe, said plate having a perforation adapted to be alined with said delivery pipe to form a passage for the grain when being delivered therefrom; a handle for shifting said plate; a door for closing said hopper, and pivotally mounted upon the bottom thereof; a telescopic tube mounted in said feed box and in line with said delivery pipe and having a movable lower section; a rocking shaft journaled in said feed box and provided with a series of members; a flexible connection between said movable section of said tube and one of said members and for raising and lowering said movable section; a series of reciprocating devices manually operable for engaging respectively the others of said members to rotate the said rocking shaft; a transmission mechanism operatively connecting said door of said hopper and said reciprocating devices to close the said door when said reciprocating devices are operated; a locking arm adapted to engage the said valve plate to hold the same in position to close the said delivery pipe; means for maintaining said locking arm in locking position; a shaft mounted in said feed box to support said locking arm; and a plurality of hook members fixedly mounted on said shaft supporting the locking arm, said hook members extending into the path of said reciprocating devices when said locking arm is released from said valve plate to engage the same when advanced to rotate the said rocking shaft to prevent the return of said reciprocating devices.

11. A horse feeding machine, comprising a magazine for holding grain and having a depended delivery pipe; a feed box connected with said magazine to infold the delivery end of said pipe; a hopper mounted in said feed box and below and in line with said delivery pipe; a valve plate slidably mounted in said feed box to close the end of said delivery pipe, said plate having a perforation adapted to be alined with said delivery pipe to form a passage for the grain when being delivered therefrom; a handle for shifting said plate; a door for closing said hopper, and pivotally mounted upon the bottom thereof; a telescopic tube mounted in said feed box and in line with said delivery pipe, and having a movable lower section; a rocking shaft journaled in said feed box and provided with a series of members; a flexible connection between said movable section of said tube and one of said members and for raising and lowering said movable section; a series of reciprocating devices manually operable for engaging respectively the others of said members to rotate the said rocking shaft; a transmission mechanism operatively connecting said door of said hopper and said reciprocating devices to close the said door when said reciprocating devices are operated; a locking arm having an elongated head adapted to rest in the path of the said valve plate to prevent the movement thereof, said head adapted at times to rest under the said plate; means for maintaining said locking arm in locking position; a shaft mounted in said feed box to support said locking arm, said shaft being extended parallel with the said rocking shaft; and a plurality of hook members fixedly mounted on said shaft supporting the locking arm, said hook members extending into the path of said reciprocating devices when said locking arm is released from said valve plate to engage the same when advanced to rotate the said rocking shaft to prevent the return of said reciprocating devices.

12. A horse feeding machine, comprising a magazine for holding grain and having a depended delivery pipe; a feed box connected with said magazine to infold the delivery end of said pipe; a hopper mounted in said feed box and below and in line with said delivery pipe; a valve plate slidably mounted in said feed box to close the end of said delivery pipe, said plate having a perforation adapted to be alined with said delivery pipe to form a passage for the grain when being delivered therefrom; a handle for shifting said plate; a door for closing said hopper, and pivotally mounted upon the bottom thereof; a telescopic tube mounted in said feed box and in line with said delivery pipe, and having a movable lower section; a rocking shaft journaled in said feed box and provided with a series of members; a flexible connection between said movable section of said tube and one of said members and for raising and lowering said movable section; a series of reciprocating devices manually operable for engaging respectively the others of said members to rotate said rocking shaft; a transmission mechanism operatively connecting said door of said hopper and said reciprocating devices to close the said door when said reciprocating devices are operated; a locking arm having an elongated head adapted to rest in the path of the said valve plate to prevent the movement thereof, said head adapted to rest under the said plate; means for maintaining said locking arm in locking position; a shaft mounted in said feed box to support said locking arm; said shaft being extended parallel with the said rocking shaft; a plurality of hook members fixedly mounted on said shaft supporting said locking arm, said hook members extending into the path of said reciprocating devices to engage the same when advanced to rotate the said rocking shaft to prevent the return of said reciprocating devices; a plurality of interference devices carried by said reciprocating devices and in operative position to release the said locking arm from the said valve plate; and a plurality of latches mounted on the frame of the machine adjacent to said reciprocating devices, and arranged to dislodge the said interference devices to place the same in inoperative positions on the retraction of each of the said reciprocating devices.

13. A horse feeding machine, comprising a magazine for holding grain and having a depended delivery pipe; a feed box connected with said magazine to infold the delivery end of said pipe; a hopper mounted in said feed box and below and in line with said delivery pipe; a valve plate slidably mounted in said feed box to close the end of said delivery pipe, said plate having a perforation adapted to be alined with said delivery pipe to form a passage for the grain when being delivered therefrom; a handle for shifting said plate; a door for closing said hopper, and pivotally mounted upon the bottom thereof; a telescopic tube mounted in said feed box and in line with said delivery pipe, and having a movable lower section; a rocking shaft journaled in said feed box and provided with a series of members; a flexible connection between said movable section of said tube and one of said members and for raising and lowering said movable section; a series of reciprocating devices manually operable for engaging respectively the others of said members to rotate the said rocking shaft; a transmission mechanism operatively connecting said door of said hopper and said reciprocating devices to close the said door when said reciprocating devices are operated; a locking arm adapted to engage the said valve plate to hold the same in position to close the said delivery pipe; means for maintaining said locking arm in locking position; a shaft mounted in said feed box to support said locking arm; a plurality of hook members fixedly mounted on said shaft supporting the locking arm, said hook members adapted to be extended into the path of said reciprocating devices to engage the same when advanced to rotate the said rocking shaft and to prevent the return of said reciprocating devices; a plurality of interference devices carried by said reciprocating devices in operative position to release the said locking arm from the said valve plate; and a plurality of latches mounted on the frame of the machine adjacent to said reciprocating devices, and arranged to dislodge the said interference devices to place the same in inoperative positions on the retraction of each of the said reciprocating devices.

14. A horse feeding machine, comprising a magazine for holding grain and having a depended delivery pipe; a feed box connected with said magazine to infold the delivery end of said pipe; a hopper mounted in said feed box and below and in line with said delivery pipe; a valve plate slidably mounted in said feed box to close the end of said delivery pipe, said plate having a perforation adapted to be alined with said delivery pipe to form a passage for the grain when being delivered therefrom; a handle for shifting said plate; a door for closing said hopper, and pivotally mounted upon the bottom thereof; a telescopic tube mounted in said feed box and in line with said delivery pipe, and having a movable lower section; a rocking shaft journaled in said feed box and provided with a series of members; a flexible connection between said movable section of said tube and one of said members and for raising and lowering said movable section; a series of reciprocating devices manually operable for engaging respectively the others of said members to rotate the said rocking shaft; a transmission mechanism operatively connecting said door of said hopper and said reciprocating devices to close the said door when said reciprocating devices are operated; a locking device for holding the said valve plate in closed relation with said delivery pipe, said locking device arranged to be released by the operation of said reciprocating devices; a locking mechanism adapted to be engaged with each of said reciprocating devices when advanced to rotate the said rocking shaft to prevent the retraction thereof; a plurality of interference devices carried by said reciprocating devices in operative position to remove the said locking device from the said valve plate; and a plurality of latches mounted on the frame of the machine adjacent to said reciprocating devices, and arranged to dislodge the said interference devices to place the same in inoperative positions on the retraction of each of said reciprocating devices.

15. A horse feeding machine, comprising a magazine for holding grain and having a depended delivery pipe; a feed box infolding the delivery end of said pipe; a hopper disposed below and in line with said pipe; a valve plate to close said pipe and having a delivery opening therein adapted to aline with said pipe, said plate slidably mounted in said feed box; a delivery door hingedly mounted upon the bottom of said hopper; a telescopic tube mounted on said feed box and in line with said delivery pipe to receive grain therefrom, said tube having a movable section depended within said hopper and vertically adjustable therein; a mechanism to raise and lower the said movable section of said tube, said mechanism embodying a rocking shaft journaled in said feed box and a flexible connection between the said shaft and said movable section; a plurality of reciprocating members; means for operatively connecting the reciprocating members with said shaft to rotate the same; means for varying the extent of rotation of said shaft by each of said reciprocating members; a transmission mechanism operatively connected with said reciprocating members and with said door, to close the said door coincidently with the operation of said reciprocating members; a transmission mechanism connecting said rocking shaft and said reciprocating members for releasing said plate coincident with the operation of said reciprocating members; a latch for locking said valve plate; a plurality of interference devices carried by said reciprocating members in position to release the said latch from locking engagement with said valve plate; and means for removing from operative position the said interference devices on the retraction of said reciprocating members.

In testimony whereof I have signed my name to this specification in the presence of two subscribing witnesses.

JOHN B. JOHNS.

Witnesses:
W. S. BLACK,
A. G. MARTIN.

---

Copies of this patent may be obtained for five cents each, by addressing the "Commissioner of Patents, Washington, D. C."